(12) United States Patent
Oh

(10) Patent No.: US 12,124,957 B2
(45) Date of Patent: Oct. 22, 2024

(54) APPARATUS AND METHOD OF COMPRESSING NEURAL NETWORK

(71) Applicant: Samsung Electronics Co., Ltd., Suwon-si (KR)

(72) Inventor: Youngmin Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 16/524,341

(22) Filed: Jul. 29, 2019

(65) Prior Publication Data

US 2020/0184333 A1 Jun. 11, 2020

(30) Foreign Application Priority Data

Dec. 10, 2018 (KR) ........................ 10-2018-0158388

(51) Int. Cl.
*G06N 3/08* (2023.01)
*G06N 3/082* (2023.01)

(52) U.S. Cl.
CPC .................................. *G06N 3/082* (2013.01)

(58) Field of Classification Search
CPC ....................................................... G06N 3/082
USPC ........................................................... 706/25
See application file for complete search history.

(56) References Cited

U.S. PATENT DOCUMENTS

| 7,080,053 B2 | 7/2006 | Adams et al. |
| 2018/0046919 A1 | 2/2018 | Li et al. |
| 2018/0096078 A1* | 4/2018 | Leeman-Munk ... G06F 16/9024 |
| 2018/0096249 A1 | 4/2018 | Kim et al. |
| 2018/0114114 A1 | 4/2018 | Molchanov et al. |
| 2018/0181867 A1 | 6/2018 | Seibold et al. |

(Continued)

FOREIGN PATENT DOCUMENTS

KR 10-2018-0037558 A 4/2018

OTHER PUBLICATIONS

Jaiswal, et al., "Deep neural network compression via knowledge distillation for embedded applications", 2017 Nirma University International Conference on Engineering (NUiCONE), 2017 (Year: 2017).*

(Continued)

*Primary Examiner* — Van C Mang
(74) *Attorney, Agent, or Firm* — NSIP Law

(57) ABSTRACT

Provided are an apparatus and method of compressing an artificial neural network. According to the method and the apparatus, an optimal compression rate and an optimal operation accuracy are determined by compressing an artificial neural network, determining a task accuracy of a compressed artificial neural network, and automatically calculating a compression rate and a compression ratio based on the determined task accuracy. The method includes obtaining an initial value of a task accuracy for a task processed by the artificial neural network, compressing the artificial neural network by adjusting weights of connections among layers of the artificial neural network included in information regarding the connections, determining a compression rate for the compressed artificial neural network based on the initial value of the task accuracy and a task accuracy of the compressed artificial neural network, and re-compressing the compressed artificial neural network according to the compression rate.

20 Claims, 10 Drawing Sheets

(56) References Cited

U.S. PATENT DOCUMENTS

2019/0180184 A1    6/2019  Deng et al.

OTHER PUBLICATIONS

Jong Hwan Ko, "Adaptive Weight Compression for Memory-Efficient Neural Networks", IEEE, 2017 (Year: 2017).*
Song Han, "Deep Compression: Compressing Deep Neural Networks With Pruning, Trained Quantization and Huffman Coding", 2016 (Year: 2016).*
Jian Hao Luo, "ThiNet: A Filter Level Pruning Method for Deep Neural Network Compression", 2017 (Year: 2017).*
Reza Abbasi-Asl, "Structural Compression of Convolutional Neural Networks Based on Greedy Filter Pruning" (Year: 2017).*
Changan Chen, "Constraint-Aware Deep Neural Network Compression", 2018 (Year: 2018).*
Hu, "A novel channel pruning method for deep neural network compression", 2018 (Year: 2018).*
Han, Song et al., "Deep Compression: Compressing Deep Neural Networks with Pruning, Trained Quantization and Huffman Coding", Corr, arXiv preprint arXiv:1510.00149, Feb. 15, 2016 (14 pages in English).
He, Yihui et al., "Channel Pruning for Accelerating Very Deep Neural Networks", 2017 IEEE International Conference on Computer Vision (ICCV), Jul. 20, 2017 (9 pages in English).
Luo, Jian-Hao et al., "ThiNet: A Filter Level Pruning Method for Deep Neural Network Compression", *2017 IEEE International Conference on Computer Vision (ICCV)*, Jul. 20, 2017 (9 pages in English).

\* cited by examiner

APPARATUS AND METHOD OF COMPRESSING NEURAL NETWORK

CROSS-REFERENCE TO RELATED APPLICATION

This application claims the benefit under 35 USC § 119(a) of Korean Patent Application No. 10-2018-0158388, filed on Dec. 10, 2018, in the Korean Intellectual Property Office, the entire disclosure of which is incorporated herein by reference for all purposes.

BACKGROUND

1. Field

The following description relates to an apparatus and method of adaptively compressing an artificial neural network by analyzing the artificial neural network.

2. Description of Related Art

Neural network are specialized computational architecture, which after substantial training may provide computationally intuitive mappings between input patterns and output patterns. Recently, as the artificial neural network technology has developed, studies for analyzing input data and extracting valid information in various types of electronic systems are being actively conducted.

An artificial neural network device needs a large number of calculations for complex input data. On the other hand, as the amount of learning of an artificial neural network increases, the connectivity of the artificial neural network becomes more complicated and the accuracy of the previously learned data increases. However, in this case, the reliability of prediction values regarding new data may decrease (overfitting problem). Also, as the complexity of the artificial neural network increases and memory use increases, problems arise in miniaturization and commercialization.

A compression technique for reducing the system cost in an artificial neural network while maintaining the performance of the artificial neural network is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of compressing an artificial neural network, the method including obtaining an initial value of a task accuracy for a task processed by the artificial neural network, compressing the artificial neural network by adjusting weights of connections among layers of the artificial neural network included in information regarding the connections, determining a compression rate for the compressed artificial neural network based on the initial value of the task accuracy and a task accuracy of the compressed artificial neural network, and re-compressing the compressed artificial neural network according to the compression rate.

The determining of the compression rate may include determining the compression rate to increase the task accuracy of the compressed artificial neural network, in response to the task accuracy of the compressed artificial neural network being less than the initial value.

The method may include performing a compression-evaluation operation to determine a task accuracy of the re-compressed artificial neural network and a compression rate for the re-compressed artificial neural network.

The method may include performing the compression-evaluation operation based on a accuracy loss threshold and the task accuracy of the re-compressed artificial neural network.

The method of claim 3, may include comparing the compression rate of the re-compressed artificial neural network with a lower threshold, and determining whether to terminate a current compression session and to start a compression session after the compression rate is set to an initial reference value, based on a result of the comparison.

The re-compressing of the artificial neural network may include determining a compression ratio of the compressed artificial neural network based on the compression rate and a task accuracy for a task processed by the compressed artificial neural network, and re-compressing the artificial neural network based on the determined compression ratio.

The re-compressing of the artificial neural network may include re-compressing the artificial neural network by adjusting weights from among nodes belonging to different layers from among layers of the compressed artificial neural network according to the compression ratio.

The compression ratio may be determined to reduce a degree of loss of a task accuracy with respect to a compression rate.

The artificial neural network may include a trained artificial neural network.

In another general aspect, there is provided an apparatus for compressing an artificial neural network, the apparatus including a controller configured to obtain an initial value of a task accuracy for a task processed by the artificial neural network, compress the artificial neural network by adjusting weights of connections among layers of the artificial neural network included in information regarding the connections, determine a compression rate for the compressed artificial neural network based on the initial value of the task accuracy and a task accuracy of the compressed artificial neural network, and re-compress the compressed artificial neural network according to the compression rate.

The controller may be configured to determine the compression rate to increase task accuracy, in response to the task accuracy of the compressed artificial neural network being less than the initial value.

The controller may be configured to perform a compression-evaluation operation to determine a task accuracy of the re-compressed artificial neural network and a compression rate for the re-compressed artificial neural network.

The controller may be configured to determine whether to perform the compression-evaluation operation based on a accuracy loss threshold and the task accuracy of the re-compressed artificial neural network.

The controller may be configured to compare the compression rate of the re-compressed artificial neural network with a lower threshold, and to determine whether to terminate a current compression session and to start a compression session after the compression rate is set to an initial reference value, based on a result of the comparison.

The controller may be configured to determine a compression ratio of the compressed artificial neural network based on the compression rate and a task accuracy for a task processed by the compressed artificial neural network, and re-compresses the artificial neural network based on the determined compression ratio.

The controller may be configured to re-compresses the artificial neural network by adjusting weights from among nodes belonging to different layers from among layers of the compressed artificial neural network according to the compression ratio.

The controller may be configured to re-compresses the artificial neural network by adjusting weights with a value lesser than a threshold from among nodes of the compressed artificial neural network according to the compression ratio.

The compression ratio may be determined to reduce a degree of loss of a task accuracy with respect to a compression rate.

Other features and aspects will be apparent from the following detailed description, the drawings, and the claims.

Figure 1:
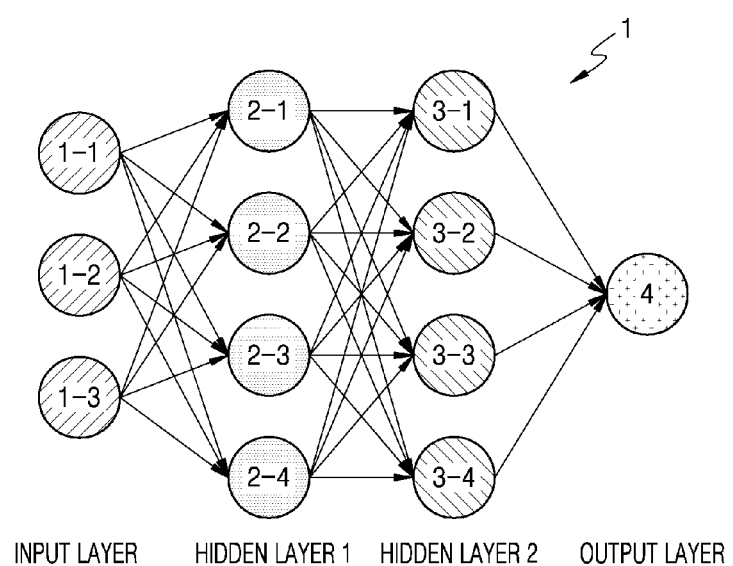
FIG. 1 is a diagram illustrating an example of an artificial neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing. As used herein, the term "and/or" includes any one and any combination of any two or more of the associated listed items. In addition, unless explicitly described to the contrary, the word "comprise" and variations such as "comprises" or "comprising" will be understood to imply the inclusion of stated elements but not the exclusion of any other elements. It will be further understood that the terms "comprises" and/or "comprising" used herein specify the presence of stated features, components, or steps, but do not preclude the presence or addition of one or more other features, components, or steps.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. Throughout the disclosure, the expression "at least one of a, b or c" indicates only a, only b, only c, both a and b, both a and c, both b and c, all of a, b, and c, or variations thereof. The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of an artificial neural network.

A deep neural network (DNN) is a mechanism for implementing an artificial neural network and may include multiple layers. For example, a deep neural network includes an input layer to which input data is applied, an output layer that outputs a predicted result derived based on learning, and multiple hidden layers between the input layer and the output layer. The DNN or the n-layer neural networks may correspond to neural networks such as, for example, Convolutional Neural Networks (CNNs), Recurrent Neural Networks (RNNs), Deep Belief Networks (DBNs), Restricted Boltzmann Machines (RBMs), fully-connected network (FCN), a deep convolutional network (DCN), a long-short term memory (LSTM) network, and a grated recurrent units (GRUs). For example, the neural network may be a CNN, although not limited thereto. A CNN may further include a sub-sampling layer (or called a pooling layer) and a fully connected layer, in addition to a convolution layer.

Hereinafter, the input layer will be referred to as the lowermost layer, the output layer will be referred to as the uppermost layer, and layers from the output layer, which is the uppermost layer, to the input layer, which is the lowermost layer, will be sequentially named based on layer rankings. For example, a hidden layer 2 is an upper layer of a hidden layer 1, but is a lower layer of the output layer.

For example, a deep neural network may include a plurality of layers, a relatively upper layer between adjacent layers may output a certain computed value by receiving a value obtained by multiplying an output value of a relatively lower layer by a weight and applying a bias thereto, and the corresponding computed value may be applied to an upper layer adjacent to the corresponding relatively higher layer in a similar manner.

A method of training an artificial neural network is referred to as deep learning, and various algorithms like a convolution neural network and a recurrent neural network may be used for deep learning as described above.

In an example, training an artificial neural network may indicate determining and updating weights and biases between layers or weights and biases among a plurality of nodes belonging to different layers adjacent to one another.

For example, weights and biases of a plurality of layered structures, a plurality of layers, or nodes may be collectively referred to as connectivity of an artificial neural network. Therefore, training an artificial neural network may indicate construction and training of the connectivity.

The neural network 1 may be implemented as an architecture having a plurality of layers including an input image, feature maps, and an output. In the neural network 1, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network 1 may be finally output.

For example, when an image of a 24×24 pixel size is input to the neural network 1, the input image may be output as feature maps of 4 channels each having a 20×20 size through a convolution operation with weights. Also, some of the pixel values of the feature maps of 4 channels each having the 20×20 size may be subject to a sub-sampling operation, such as, for example, max-pooling and average-pooling, to output feature maps of 4 channels each having a 10×10 size. In an example, the 10×10 feature maps may be repeatedly subject to convolution operations and sub-sampling operations with weights so that the sizes of the 10×10 feature maps may be reduced, and global features may be output. The neural network 1 may repeatedly perform convolution operations and sub-sampling (or pooling) operations on the several layers to filter robust features, i.e., global features that are capable of representing the input image from the input image, to output the global features, and to input the global features to the fully connected layer, thereby recognizing the input image.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

Referring to FIG. 1, each of a plurality of layers may include a plurality of nodes.

Referring to FIG. 1, nodes of one layer are completely connected to a plurality of nodes of an adjacent layer. For example, a node 3-1 of the hidden layer 2 is connected to all nodes of a hidden layer 1, i.e., nodes 2-1 to 2-4 and receives values obtained by multiplying output values of the respective nodes 2-1 to 2-4 by a certain weight.

Data input to the input layer is processed through hidden layers, and thus an output value is output from the output layer. In this case, the larger the weight is, the stronger the connectivity between two corresponding nodes becomes. On the other hand, the smaller the weight is, the weaker the connectivity between the two corresponding nodes becomes. For example, a weight may have a value between 0 and 1. When the weight is 0, it may indicate that there is no connectivity between two nodes.

On the other hand, as the connectivity through the weight increases, the connectivity of an artificial neural network may be strengthened and the complexity thereof may increase. As a result, memory allocation for storing the weight increases, and the overall operation speed of the artificial neural network may decrease, and thus the efficiency of the artificial neural network may be deteriorated.

Figure 2:
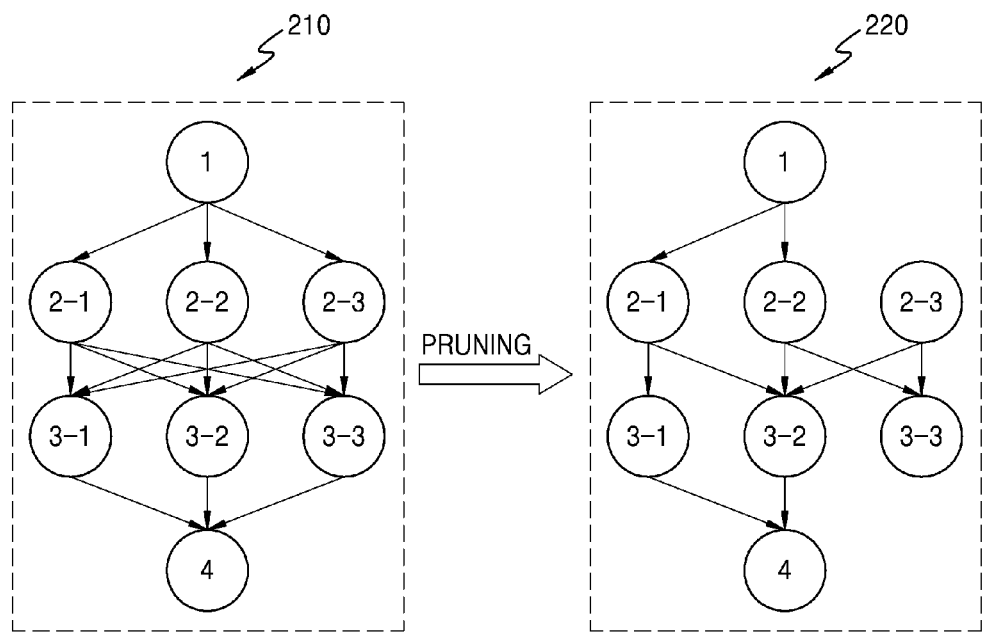
FIG. 2 is a diagram illustrating an example of pruning.

FIG. 2 is a diagram illustrating an example of pruning.

In FIG. 2, an artificial neural network 210 shows some of the layers of an artificial neural network that is trained before pruning is performed. Also, in FIG. 2, an artificial neural network 220 shows some of the corresponding layers of an artificial neural network to which pruning is performed.

Referring to FIG. 2, a connection relationship is established between all of the combinations between two neurons included in two adjacent layers different from each other in the artificial neural network 210.

In FIG. 2, the artificial neural network 210, which is a trained artificial neural network, may be fully-connected, and thus a weight indicating a connection strength between any two neurons in adjacent layers different from each other in the artificial neural network may be greater than 0. When there is connectivity between neurons in all adjacent layers, the overall complexity of the artificial neural network increases. Also, the accuracy and the reliability of an estimated result of the artificial neural network may deteriorate due to over-fitting.

By taking this into account, pruning for the artificial neural network may be performed. For example, in FIG. 2, in the artificial neural network 210 before pruning, when a weight between a node 1 and a node 2-3 is below a certain threshold value, pruning for weakening or removing the connectivity between the node 1 and the node 2—may be performed.

To determine a portion of an artificial neural network that may be pruned, the artificial neural network may be searched. In an example, the artificial neural network may be pruned by removing or reducing portions of artificial neural network parameters or layers that do not substantially impair the accuracy of the artificial neural network.

Pruning may be performed on a layer of an artificial neural network that does not substantially affect the output of the artificial neural network. For example, pruning may be performed on one or more input feature maps of a layer that do not substantially affect the output feature map generated by the layer.

Connections among neurons with weights less than a threshold value may be searched for. Connection relationships corresponding to all weights that are identified as having values less than a threshold value may be removed, set completely to zero, or ignored.

When weights are small, for example, when weights are less than a particular lower threshold value, a layer of an artificial neural network may be detected. In this case, the detected layer may be selected as a candidate for removal from the artificial neural network.

Pruning may include reducing the precision of numerical forms of one or more numerical values of the artificial neural network. For example, it may be determined whether the precision of numerical forms used for weights may be reduced through analysis of one or more weights in a plurality of layers of the artificial neural network. As the precision of used numerical forms is reduced, lower precision arithmetic hardware may be used sequentially. Low precision arithmetic hardware is more power efficient and may be densely arranged as compared to high precision arithmetic hardware. An artificial neural network that uses the minimum number of bits needed to represent the precision and the range of parameters may exhibit higher performance, e.g., fast operation speed and/or lower power consumption, than an artificial neural network that uses more bits than needed.

Figure 3:
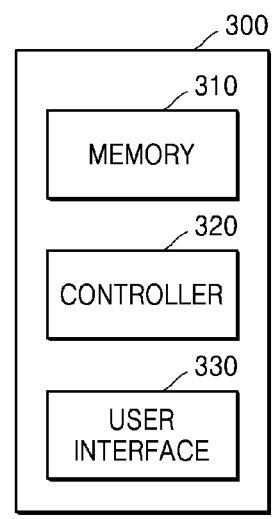
FIG. 3 is a diagram illustrating an example of an apparatus for compressing an artificial neural network.

FIG. 3 is a diagram illustrating an example of an apparatus 300 for compressing an artificial neural network.

As shown in FIG. 3, the apparatus 300 may include a memory 310, a controller 320, and a user interface 330.

The memory 310, the controller 320, and the user interface 330 may be connected via a system bus or other suitable circuitry.

The controller 320 may control all operations for driving the neural network apparatus 3.

For example, the controller 320 may execute programs stored in the memory 310 of the apparatus 300 to control all operations of the apparatus 300. The controller 320 includes at least one of the apparatuses described with reference to FIGS. 3 and 4 or performs at least one of the methods described with reference to FIGS. 1, 2, and 4 through 9. The controller 320 refers to a data processing device configured as hardware with a circuitry in a physical structure to execute desired operations. For example, the desired operations may include codes or instructions included in a program. For example, the controller 320 may be implemented as a microprocessor, a processor core, a multicore processor, a multiprocessor, a central processing unit (CPU), a graphics processing unit (GPU), an application processor (AP), an application-specific integrated circuit (ASIC), and a field programmable gate array (FPGA) included in the neural network apparatus 3, although not limited thereto. Also, the controller 320 may execute programs stored in the memory 310 to control all operations of the apparatus 300. For example, the controller 320 may be implemented as a microprocessor (MCU) in which a CPU, a memory (Read Only Memory (ROM) or Radom Access Memory (RAM)), etc. are installed in a single chip, although not limited thereto. Further details regarding the controller 320 are provided below.

The apparatus 300 may store program code in the memory 310. The controller 320 may process an operation for compressing an artificial neural network by executing program code read from the memory 310 via the system bus.

The memory 310 may include one or more physical memory devices, such as a local memory or one or more bulk storage devices. At this time, the local memory may include random access memory (RAM) or other volatile memory devices typically used while actually executing program code. The bulk storage device may be implemented as a hard disk drive (HDD), a solid state drive (SSD), or other non-volatile memory devices. The apparatus 300 may also include one or more cache memories (not shown) that provide spaces for temporarily storing at least some program code to reduce the number of times for searching for program code in bulk storage devices during a compression operation.

As executable program code stored in the memory 310 is executed by the apparatus 300, the controller 320 may perform various operations described herein. For example, the memory 310 may store program code for the controller 320 to perform one or more of the operations described with reference to FIGS. 1, 2, and 4 through 9.

The user interface 330 is a physical structure that includes one or more hardware components that provide the ability to render a user interface, render a display, outputs information, and/or receive user input. The user interface 330 outputs the result that it receives from the apparatus 300. However, the user interface 330 is not limited to the example described above, and in an example, any displays, such as, for example, computer monitor and eye glass display (EGD) that are operatively connected to the apparatus 300 may be used without departing from the spirit and scope of the illustrative examples described.

Depending on particular types of a device being implemented, the apparatus 300 may include fewer components than shown or may include additional components not shown in FIG. 3. Also, one or more components may be included in another component, or otherwise constitute a part of another component.

The controller 320 may obtain an initial value of a task accuracy for an inference task processed by a trained artificial neural network.

An artificial neural network may perform learning regarding a desired task and construct an inference model. In addition, the artificial neural network may output a result of inference regarding an external input value based on the constructed inference model.

For tasks performed by using an artificial neural network, an artificial neural network may be applied to recognition and classification tasks as performed by a facial recognition module or software for smartphones, object recognition, speech recognition, and image classification, medical and diagnostic devices, and unmanned systems and may also be implemented as a dedicated processing device for processing image data and extracting meaningful information.

The controller 320 may evaluate a trained artificial neural network, thereby obtaining an initial value of a task accuracy. The task accuracy may include a mean squared error (MSE), which indicates an error between a result of inference by the artificial neural network and an expected result. The smaller the MSE, the better the performance of the artificial neural network.

For example, the controller 320 may input a data set for measuring the performance of an artificial neural network to the artificial neural network to measure the accuracy of a task. The controller 320 may determine the task accuracy by calculating an MSE between a result of inference by the artificial neural network and an expected result based on the input data set. In an example, the data set may be determined differently depending on the field of the art of a target task of the artificial neural network. For example, in the field of image classification, data sets like cifar-10 and cifar-100 may be used.

The controller 320 may obtain a task accuracy of the trained artificial neural network before performing compression, as an initial value of the task accuracy. For example, the task accuracy may be calculated by inputting a training data set and evaluating a result predicted by the artificial neural network. The task accuracy may be prediction loss having a smaller value as a result inferred by the artificial neural network becomes more accurate. The task accuracy may be measured in various other ways. In an example, the controller 320 may evaluate the artificial neural network for a number of times and obtain a task accuracy based on an average of the results of the evaluations.

As used herein, the term "compression" refers to the reduction of the capacity of an artificial neural network. For example, compression of an artificial neural network may include pruning. Pruning is a technique for reducing the capacity of an artificial neural network by removing weights that are less influential on the accuracy of the task of the artificial neural network from among weights of the artificial neural network.

The controller 320 may compress an artificial neural network by adjusting weights of connections included in information regarding connections between a plurality of layers constituting a trained artificial neural network. For example, the controller 320 may compress an artificial neural network by adjusting at least some of connections among layers used to transmit and receive information regarding a plurality of layers of a trained artificial neural network.

At this time, the controller 320 may obtain information regarding connections among a plurality of layers constituting a trained artificial neural network. In other words, the controller 320 may obtain information regarding each of the layers of a multi-layered artificial neural network and information regarding connections among the layers. Also, information regarding connections may include information regarding weights of connections between layers adjacent to one another.

The controller 320 may compress an artificial neural network by adjusting at least some of connections among layers of the artificial neural network. For example, the controller 320 may compress an artificial neural network through pruning for adjusting weights of connections in the artificial neural network. The description given above with reference to FIG. 2 may be applied in connection with pruning.

The controller 320 may determine a compression rate for an artificial neural network based on the initial value of the task accuracy and the task accuracy of a compressed artificial neural network. In an example, the controller 320 may determine the compression rate, such that the task accuracy of the compressed artificial neural network is increased when the task accuracy of the compressed artificial neural network is less than the initial value. In other words, when an inference task accuracy that is determined based on the task accuracy of a compressed artificial neural network is lower than an inference task accuracy of the artificial neural network before compression, which is determined based on the initial value of the task accuracy, the compression rate may be reduced to prevent performance deterioration of an inference task due to the compression. In an example, when the value of the task accuracy is proportional to the performance of an inference task, the controller 320 may determine that the value of the task accuracy of the compressed artificial neural network is less than the value of the task accuracy before compression and reduce the compression rate. In an example, when the value of the task accuracy is inversely proportional to the performance of an inference task, the controller 320 may determine that the value of the task accuracy of the compressed artificial neural network is less than the value of the task accuracy before compression and increase the compression rate.

The compression rate represents a degree to which compression is performed with respect to a time for performing one compression. Since the time consumed by each compressing device to perform one compression is the same, the amount of information compressed in each compression stage increases as the compression rate increases.

The controller 320 may re-compress an artificial neural network according to a determined compression rate. For example, the controller 320 may determine a compression ratio of a compressed artificial neural network based on the determined compression rate and determine the task accuracy of the compressed artificial neural network and re-compress the compressed artificial neural network based on the determined compression rate. In an example, the controller 320 may re-compress the artificial neural network by adjusting weights among nodes belonging to different layers from among a plurality of layers constituting the compressed artificial neural network according to the determined compression ratio.

To perform pruning, the controller 320 may determine a variable that determines a threshold value of weights, which is a reference value for reducing or removing weights. Also, the compression ratio may be indirectly determined by the variable that determines the threshold value of weights, which is a criterion for pruning.

The controller 320 may determine a compression cost based on the compression ratio and the task accuracy of the compressed artificial neural network. In other words, the controller 320 may determine the compression ratio, such that the compression cost indicating a degree of loss of the task accuracy with respect to the compression ratio is reduced.

For example, the controller 320 may determine a compression cost based on the variable for determining a threshold value of weights, which is a criterion for pruning, the determined compression rate, and the task accuracy of the compressed artificial neural network and update the variable for determining the threshold value.

The controller 320 may re-compress the artificial neural network based on the determined compression ratio or a threshold value, which is a criterion for pruning. The controller 320 may repeatedly perform compression-evaluation operations for re-compressing an artificial neural network and determining the task accuracy of the re-compressed artificial neural network and the compression rate for the re-compressed artificial neural network. In an example, the controller 320 may determine whether to perform additional compression-evaluation operations based on a pre-defined limit accuracy loss criterion and the task accuracy of the re-compressed artificial neural network.

The controller 320 may repeatedly perform the compression-evaluation operations to compare a determined compression rate with a lower limit threshold value of the compression rate. Based on a result of the comparison, the controller 320 may determine whether to terminate a current compression session and start a compression session after the compression rate is set to an initial reference value. For example, when the controller 320 determines that a determined compression rate is less than or equal to the lower limit threshold value of the compression rate, the controller 320 may terminate a current compression session, set the compression rate to the initial reference value, and start a next compression session. At this time, the controller 320 may store information regarding an artificial neural network compressed during the current compression session as the current compression session is terminated. As a plurality of compression sessions are terminated, the controller 320 may determine an optimal compression scheme by comparing the performances of stored artificial neural networks.

The controller 320 may perform compression-evaluation operations to obtain the task accuracy of a compressed or re-compressed artificial neural network. In an example, the controller 320 may obtain or store a task accuracy for each of a plurality of compression-evaluation operations performed during individual sessions and calculate an average task accuracy for each individual session. An average task accuracy for one session may become a comparison criterion for determining a compression rate in subsequent sessions.

Figure 4:
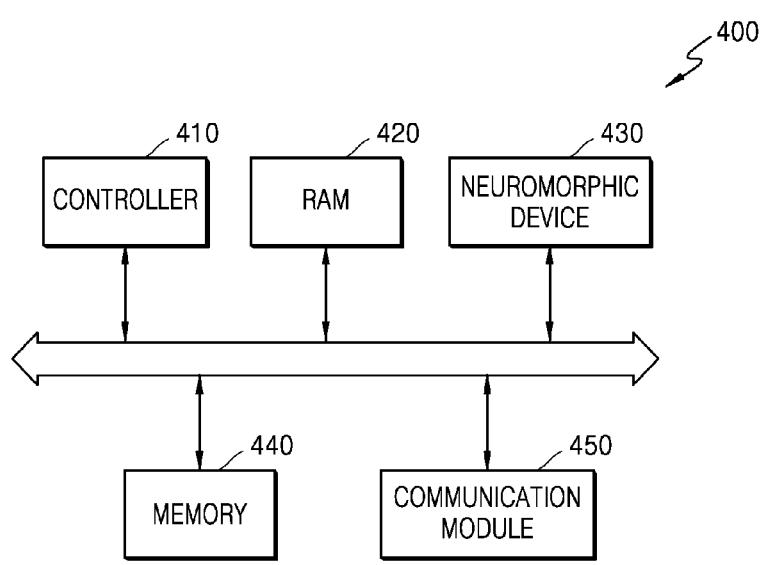
FIG. 4 is a diagram illustrating an example of a configuration of an electronic device.

FIG. 4 is a diagram illustrating an example of a configuration of an electronic device.

Referring to FIG. 4, an electronic device 400 may analyze input data in real time based on an artificial neural network, extract valid information, and determine a situation or control components of a device that has the electronic device 400 based on the extracted information. The electronic device 400 may be implemented as various kinds of devices, such as, for example, a server, a mobile device, a smart phone an embedded device, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, voice authentication systems, an Augmented Reality (AR) device, various Internet of Things (IoT) devices, robotics, medical equipment, measuring instruments, which perform voice recognition, image recognition, image classification, through a neural network, although not limited thereto. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling. The examples described herein may be used for road guidance information in a navigation device of a vehicle, such as, for example, an augmented reality head-up display (AR 3D HUD). Furthermore, the electronic device 400 may be a dedicated hardware accelerator mounted in the above-mentioned devices, and the electronic device 400 may be a hardware accelerator, such as, for example, a neural processing unit (NPU), a tensor processing unit (TPU), a neural engine, which is a dedicated module for driving a neural network, although not limited thereto. The examples described above are non-limiting, and other examples such as, for example, training, gaming, applications in healthcare, public safety, tourism, and marketing are considered to be well within the scope of the present disclosure.

The electronic device 400 may include a controller 410, RAM 420, a neuromorphic device 430, a memory 440, and a communication module 450. Some of the hardware components of the electronic device 400 may be mounted on at least one semiconductor chip.

The controller 410 controls the overall operation of the electronic device 400. The controller 410 refers to a data processing device configured as hardware with a circuitry in a physical structure to execute desired operations. For example, the desired operations may include codes or instructions included in a program. The controller 410 may include a single core or multiple cores. The controller 410 may process or execute programs and/or data stored in the memory 440. In some embodiments, controller 410 may control the functions of neuromorphic device 430 by executing programs stored in memory 440. Also, the controller 410 may perform compression for reducing the amount of weight information used by the neuromorphic device 430. In an example, the controller 410 may include a microprocessor, a central processing unit (CPU), a processor core, a multicore processor, a multiprocessor, an application-specific integrated circuit (ASIC), and a field programmable gate array (FPGA), a graphic processing unit (GPU), an application processor (AP), included in the electronic device 400, although not limited thereto. The controller 410 and the memory 440 of FIG. 4 may correspond to the controller 320 and the memory 310 of FIG. 3, respectively. In addition to the description of controller 410, the controller 310 has also been described in FIG. 3, which description is also applicable to controller 410, and is incorporated herein by reference. Thus, the above description may be omitted for convenience of description. Further details regarding the controller 410 are provided below.

The RAM 420 may temporarily store programs, data, or instructions. For example, programs and/or data stored in the memory 440 may be temporarily stored in the RAM 420 according to the control of the controller 410 or booting code. The RAM 420 may be implemented as a memory like dynamic RAM (DRAM) or static RAM (SRAM). Further details regarding the RAM 420 are provided below.

The neuromorphic device 430 may perform an operation based on received input data and generate an information signal based on a result of the operation. The neuromorphic device 430 may correspond to a hardware accelerator dedicated to an artificial neural network or a device including the same.

The information signal may include one of various types of recognition signals such as, for example, a speech recognition signal, an object recognition signal, an image recognition signal, a biometric information recognition signal. For example, the neuromorphic device 430 may receive frame data included in a video stream as input data and generate a recognition signal for an object included in an image indicated by the frame data. However, the present disclosure is not limited thereto. Depending on the type or functions of the device on which the electronic device 400 is mounted, the neuromorphic device 430 may receive various types of input data and generate various types of recognition signals according to input data.

The memory 440 is a storage area for storing data and may store an operating system (OS), various programs, and various data. In an example, the memory 440 may store intermediate results generated during an operation of the neuromorphic device 430 or weights used in the operation.

The memory 440 may be DRAM, but is not limited thereto. The memory 440 may include at least one of a volatile memory and a non-volatile memory. The non-volatile memory includes memory such as, for example, ROM, PROM, EPROM, a EEPROM, a flash memory, PRAM, MRAM, RRAM, and FRAM. The volatile memory includes memory such as, for example, DRAM, n SRAM, SDRAM, PRAM, MRAM, RRAM, and FeRAM. In an example, the memory 440 may include at least one of an HDD, an SSD, a CF card, an SD card, a Micro-SD card, a Mini-SD card, an xD card, or a memory stick. Further details regarding the memory 440 are provided below.

The communication module 450 may include various types of wired or wireless interfaces capable of communicating with external devices. For example, the communication module 450 may include communication interfaces capable of accessing a local area network (LAN), a wireless local area network (WLAN) like wireless fidelity (Wi-Fi), a wireless personal communication network (WPAN) like Bluetooth, a wireless universal serial bus (USB), Zigbee, near field communication (NFC), radio frequency identification (RFID), power line communication (PLC), or a mobile cellular network like 3rd generation (3G), 4th generation (4G), and long term evolution (LTE).

Figure 5:
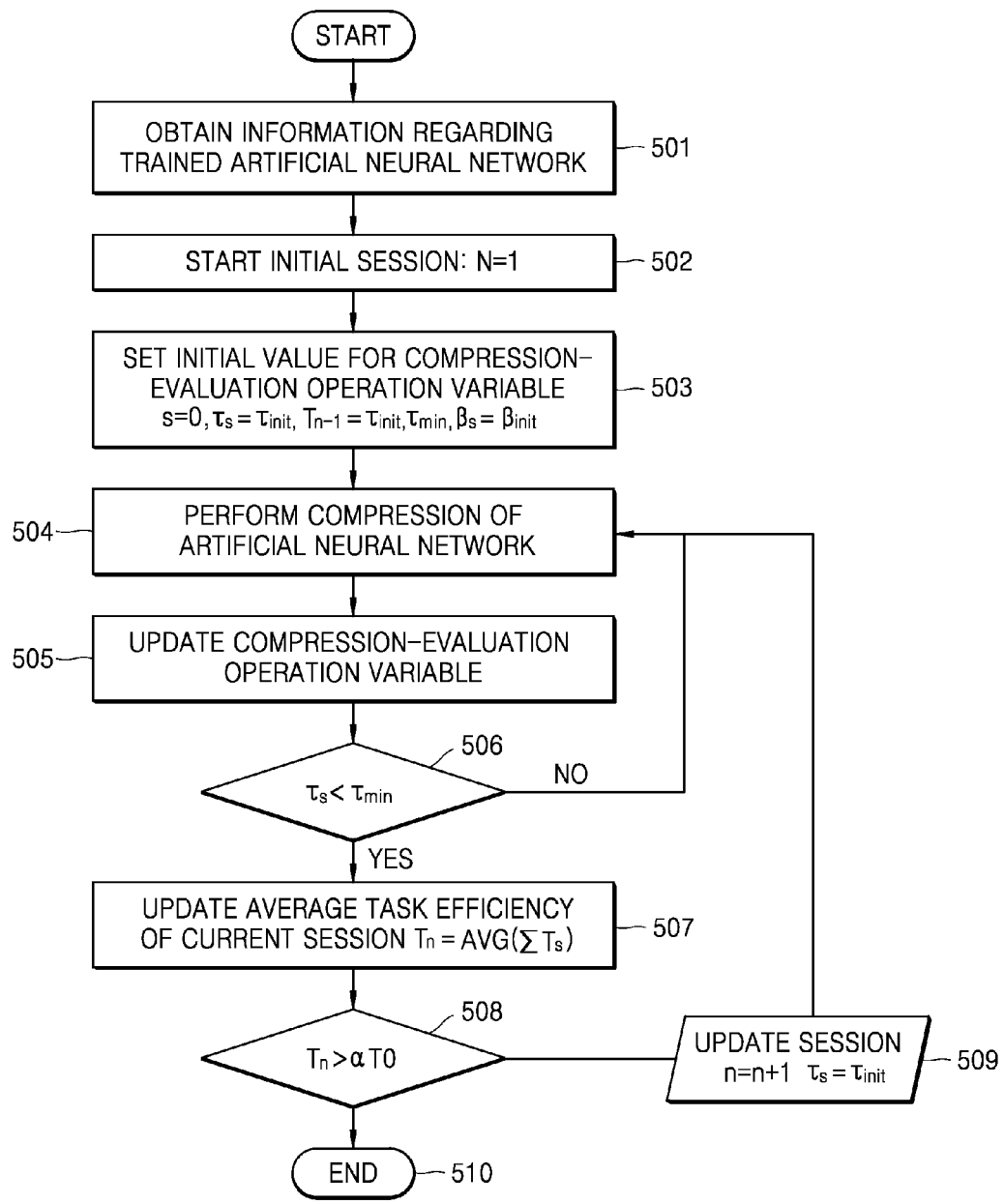
FIG. 5 is a diagram illustrating an example of a compression algorithm performed by an apparatus for compressing an artificial neural network.

FIG. 5 is a diagram illustrating an example of a compression algorithm performed by an apparatus for compressing an artificial neural network. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In an example, the operation of FIG. 5 may be performed by an apparatus (300 of FIG. 3) for compressing an artificial neural network.

The ranges of numerical values and variables and equations used in FIG. 5 may be modified within other ranges, without departing from the spirit and scope of the illustrative examples described. In addition to the description of FIG. 5 below, the descriptions of FIGS. 1-4 are also applicable to FIG. 5, and are incorporated herein by reference. Thus, the above description may not be repeated here.

In operation 501, the apparatus may obtain information regarding a trained artificial neural network. As described above, the information regarding the trained artificial neural network may include weights from among neurons belonging to layers of the multi-layers that are adjacent to one another.

In operation 502, the apparatus may initiate an initial session. At this time, an index "N" for identifying the session may be set to one.

In operation 503, the apparatus may set initial values of variables for a compression-evaluation operation. For example, the apparatus may set an index s to zero. "S" represents the number of times that the compression-evaluation operations is performed in each session.

Furthermore, the apparatus may set $\tau s$ representing a compression rate to $\tau init$, which is an initial reference rate value.

For example, $\tau init$ may represent the maximum value within a possible range of compression rates. In another example, $\tau init$ may be any value within a possible range of compression rates. For example, the compression rate $\tau s$ may have a value from 0 to 1, wherein $\tau init$ may be, but is not limited to, 1.

Furthermore, the apparatus may set an average task accuracy $T_{n-1}$ per session. The subscript n−1 rather than n indicates that the average task accuracy of a previous session is used as a criterion for comparison with the task accuracy of a current session. This is merely an example, and the task accuracy to be used as a comparison criterion may be determined in various ways.

For example, the apparatus may repeatedly perform evaluations on a trained artificial neural network based on a pre-set training data set and set an average of results of the evaluations as $\tau init$. A learning accuracy may be determined by the apparatus. In another example, the learning accuracy may be determined by an external device in which an artificial neural network is implemented or other external devices and the apparatus may then obtain the learning accuracy from the external device.

Furthermore, the apparatus may obtain the lower limit threshold value $\tau min$ of the compression rate, which may be used as a criterion for terminating each session. For example, the lower limit threshold value $\tau min$ may be a value close to a lower limit value that is determined considering a possible range of the compression rates and the lower limit value thereof. For example, the compression rate $\tau$ may have a value from 0 to 1, wherein $\tau min$ may be, but is not limited to, $10^{-20}$.

Also, the apparatus may set a threshold value-determining variable $\beta s$ for determining a threshold value of weights, which is a criterion for performing pruning as an example of compression, to an initial value. $\beta s$ is a variable of a weight conversion function for converting an existing weight through a weight unit and may determine the size of the threshold value of weights. For example, the greater the value of $\beta s$, the more the threshold is increased and the more weights are pruned and converted to a zero value or smaller weight values.

In operation 504, the apparatus may perform a compression operation on an artificial neural network based on the variables for compression-evaluation operations.

For example, the compression operation may be pruning. The apparatus may obtain information regarding all or at least some of weight values for layers adjacent to one another of an artificial neural network and perform pruning based on the compression rate $\tau s$ and the threshold value-determining variable $\beta s$ that are determined in advance.

In an example, when the weight of a node of a trained artificial neural network or an artificial neural network compressed in a previous compression-evaluation operation is less than a threshold value, which is a criterion for pruning, the apparatus may convert the weight value to 0 or reduce the weight value to a smaller value. In an example, when the weight of the node of the trained artificial neural network or the artificial neural network compressed in the previous compression-evaluation operation is greater than the threshold value, which is a criterion for pruning, the apparatus may convert the weight value to 1 or increase the weight value to a greater value.

In operation 505, the device may update the variables for compression-evaluation operations. A method of updating the variables for compression-evaluation operations will be described below in detail with reference to FIG. 6.

In operation 506, the apparatus may determine whether an updated compression rate τs is less than the lower limit threshold value τmin of the compression rate.

In operation 506, when it is determined that the compression rate τs is not less than the lower limit threshold value τmin of the compression rate, the apparatus may return to operation 504 and perform subsequent operations.

In operation 506, when it is determined that the compression rate τs is less than the lower limit threshold value τmin of the compression rate, the apparatus terminates the session. As the task accuracy of a compressed artificial neural network deteriorates and the compression rate decreases, a current session n is terminated, the compression rate τs is increased, and a next session n+1 is performed.

For example, the apparatus updates the average task accuracy of inference of a current session, which is a criterion for comparative evaluation of the task accuracy of an artificial neural network compressed in the next session n+1. For example, the apparatus may update the task accuracy of inference in session n to an average value of the task accuracy obtained every time a certain number of compression-evaluation operations are performed in the current session n. For example, the apparatus may update the task accuracy of inference according to Equation 1.

$$Tn=\text{AVG}(Ts) \qquad \text{[Equation 1]}$$

Here, $T_n$ denotes the task accuracy of inference in the session n, AVG denotes an operator for calculating an average, and $T_s$ denotes a sum of the task accuracy of the compressed artificial neural network obtained in the session n. In addition to a simple average, various methods of calculating the task accuracy of inference, which is a criterion for comparison of the task accuracy in the next session n+1, may be used without departing from the spirit and scope of the illustrative examples described.

In operation 508, the apparatus may determine whether the average task accuracy $T_n$ of inference in the session n satisfies a limit accuracy loss criterion as compared to the average task accuracy $T_0$ of inference of the trained artificial neural network before compression is performed. In an example, the apparatus may determine whether to additionally perform compression-evaluation operations based on a pre-defined limit accuracy loss criterion and the task accuracy of a re-compressed artificial neural network.

When the value of the average task accuracy of inference is inversely proportional to the task performance, the apparatus may determine whether it satisfies the limit accuracy loss criterion according to Equation 2 below.

$$T_n > \alpha T_0 \qquad \text{[Equation 2]}$$

In this case, α denotes a ratio of loss of the task accuracy of inference in the session n as compared to the initial task accuracy of inference of a trained artificial neural network. α may be 1.5, but is not limited thereto.

In operation 508, when the apparatus determines that $T_n$ is not greater than αT0, the apparatus terminates the session n in operation 509 and initiates the next session n+1. At this time, the device initiates the next session n+1 as it is determined that the task accuracy of inference in the session n satisfies the limit accuracy loss criterion based on the initial task accuracy of inference of the trained artificial neural network. The apparatus also returns to operation 504 and performs a compression operation.

In operation 509, the apparatus may store information regarding the artificial neural network compressed in the session n before initiating the next session n+1. Also, the apparatus may increase the reduced compression rate τs. For example, the apparatus may set τs to τinit, which is the initial reference value.

In operation 508, when the apparatus determines that Tn is greater than αT0, the apparatus may terminate the compression operation in operation 510. As it is determined that, since the value of the average task accuracy of inference is inversely proportional to the task accuracy, the task accuracy of inference in the session n fails to satisfy the limit accuracy loss criterion regarding the initial task accuracy of inference and is deteriorated, the compression operation is terminated.

Figure 6:
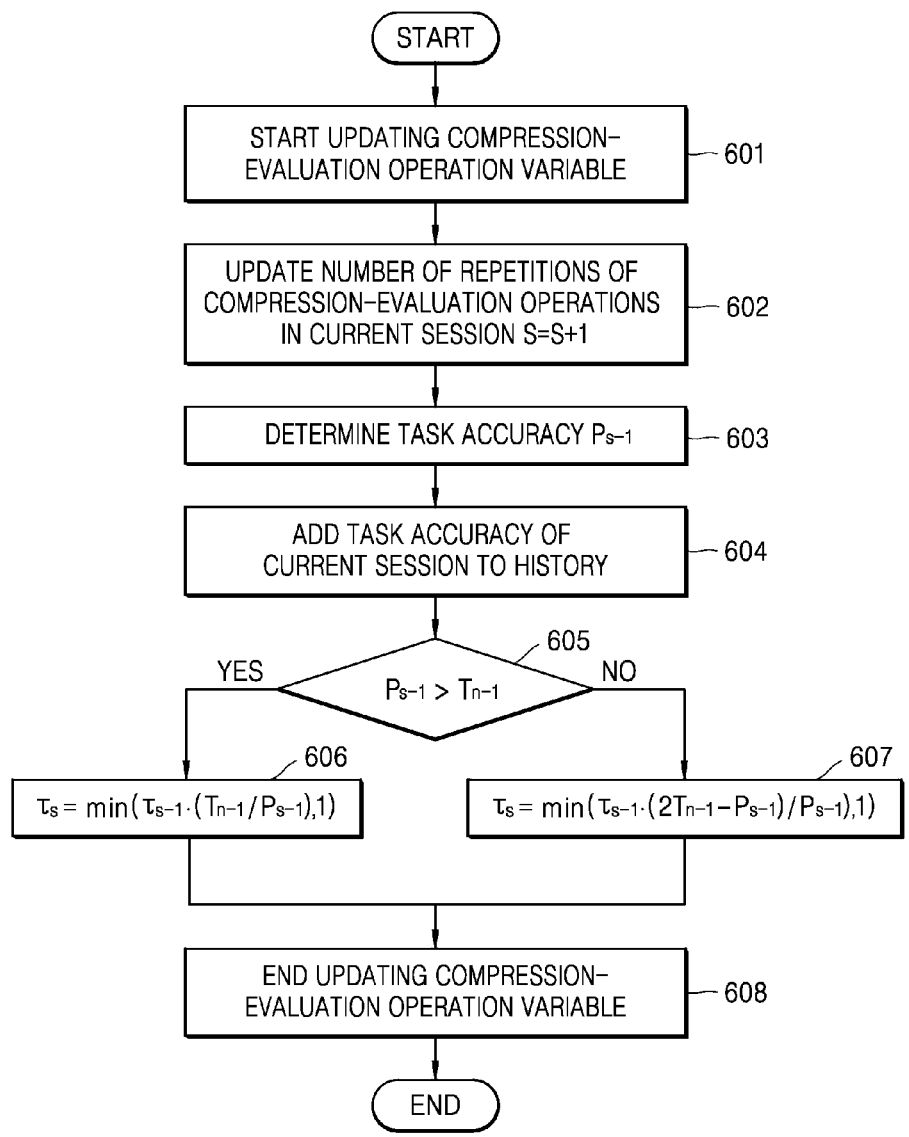
FIG. 6 is a diagram illustrating an example of an operation performed by an apparatus for updating variables for compression-evaluation operations.

FIG. 6 is a diagram illustrating an example of an operation performed by an apparatus for compressing an artificial neural network for updating variables for compression-evaluation operations. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In an example, the operation of FIG. 6 may be performed by an apparatus (300 of FIG. 3) for compressing an artificial neural network. The ranges of numerical values and variables and equations used in FIG. 6 may be modified within other ranges, without departing from the spirit and scope of the illustrative examples described. In addition to the description of FIG. 6 below, the descriptions of FIGS. 1-5 are also applicable to FIG. 6, and are incorporated herein by reference. Thus, the above description may not be repeated here.

In operation 601, the apparatus initiates an operation for updating the variables for compression-evaluation operations.

In operation 602, the apparatus updates the number s of repeating compression-evaluation operations in the session n to s+1. Hereinafter, s denotes an updated value.

In operation 603, the device may determine the task accuracy $P_{s-1}$. For example, $P_{s-1}$ may be determined based on an evaluation performed on a compressed artificial neural network. As described above, the value of the task accuracy $P_{s-1}$ may be smaller as the accuracy of inference is high.

For example, the task accuracy $P_{s-1}$ may be, but is not limited to, prediction loss.

In operation 604, the apparatus may add a task accuracy history of the current session n. For example, the apparatus may store $P_{s-1}$, which is used to determine an average task accuracy $T_n$ of inference per session as described above with reference to FIG. 5.

In operation 605, the apparatus may determine whether the value of the task accuracy $P_{s-1}$ is greater than the value of the average task accuracy $T_{n-1}$ of inference in the previous session n−1.

The apparatus may determine the compression rate to improve the task accuracy of the compressed artificial neural network when the task accuracy of the compressed artificial neural network is less than an initial value or the task accuracy $T_{n-1}$ of inference in a previous session.

In operation 605, when the apparatus determines that the value of the task accuracy $P_{s-1}$ is greater than the value of the average task accuracy $T_{n-1}$ of inference in the session n−1, the apparatus may update the compression rate τs in operation 606 according to Equation 3 below.

$$\tau_s = \min\left(\tau_{s-1}\left(\frac{T_{n-1}}{P_{s-1}}\right), 1\right) \quad \text{[Equation 3]}$$

When the apparatus determines in operation 605 that the task accuracy $P_{s-1}$ is not greater than the average task accuracy $T_{n-1}$ of inference in the session n−1, the apparatus may update the compression rate τs in operation 607 according to Equation 4 below.

$$\tau_s = \min\left(\tau_{s-1}\left(\frac{2T_{n-1} - P_{s-1}}{P_{s-1}}\right), 1\right) \quad \text{[Equation 4]}$$

In an example, a threshold value-determining variable βs for determining the size of a weight may be determined as a variable of a weight conversion function for converting an existing weight through the compression rate τs and a task accuracy weight.

The apparatus may define a compression cost, which is determined based on the task accuracy $P_{s-1}$, the compression rate τs, and the threshold value-determining variable βs, according to the compression cost function of Equation 5.

$$L = (1-T)P + \frac{T}{2}Q(\beta) \quad \text{[Equation 5]}$$

Here, τ, P, and β denote the compression rate, the task accuracy, and the threshold value-determining variables, respectively, and are the same as the variables described above. However, for convenience of explanation, subscripts are omitted. In an example, the apparatus may determine the compression ratio of the compressed artificial neural network based on a determined compression rate and the task accuracy of the compressed artificial neural network. For example, the compression ratio may be determined to reduce the compression cost, which indicates the degree of loss of a task accuracy with respect to a compression rate. In other words, the apparatus may determine the threshold value-determining variable βs, such that the value of the compression cost function is reduced.

In Equation 5, Q(s) may be expressed by Equation 6.

$$Q(\beta_s) = \sum_m \beta_{s,m}^2 \quad \text{[Equation 6]}$$

In this case, the subscript m of the threshold value-determining variable βs, m is for distinguishing pairs of adjacent layers related to a weight to be compressed. Q(s) may be variously defined and the embodiments of the disclosure herein are merely illustrative.

The apparatus may define the compression cost function L as shown in Equation 7.

$$L = (1-\tau)P + \frac{\tau}{2}\sum_m \beta_m^2 \quad \text{[Equation 7]}$$

At this time, P=P(f) may be expressed for any f. f may be a weight conversion function described below with reference to FIGS. 8 and 9.

Accordingly, the apparatus may update a weight wn according to Equation 8 below.

$$w_s = w_{s-1} - \gamma(1 - T_{s-1})\frac{\partial P}{\partial f}\frac{\partial f}{\partial w_{s-1}} = w_{s-1} - \gamma\frac{\partial f}{\partial w_{s-1}} \quad \text{[Equation 8]}$$

The apparatus may update the threshold value-determining variable β_s according to Equation 9 below.

$$\beta_{s,m} = \beta_{s-1,m} - \gamma(1 - T_{s-1})\frac{\partial P}{\partial f}\frac{\partial f}{\partial \beta_{s-1,m}} - \gamma \tau_{s-1}\beta_{s-1,m} = \quad \text{[Equation 9]}$$

$$\beta_{s-1,m} - \gamma\frac{\partial f}{\partial \beta_{s-1,m}}$$

In Equation 8 and Equation 9, γ denotes a learning rate.

In Equation 9, the subscript m of the threshold value-determining variable βs, m is for distinguishing pairs of adjacent layers related to a weight to be compressed. In Equation 8 or Equation 9, the compression rate τS−1) before being updated by Equation 3 or Equation 4 or the compression rate τs updated by Equation 3 or Equation 4 may be used.

In operation 608, the apparatus may terminate updating of a compression-evaluation operation variable.

In general, the accuracy of an artificial neural network may decrease as the compression rate of the artificial neural network increases. According to the examples described above with reference to FIGS. 4 to 6, the variables for performing compression may be determined through data and relationship equations obtained by the apparatus. In other words, as disclosed above, the need to fine tune or manually set sensitive key parameters to determine an optimal compression is eliminated. As a result, the time and cost for compression may be reduced and the compression efficiency may be improved.

Figure 7:
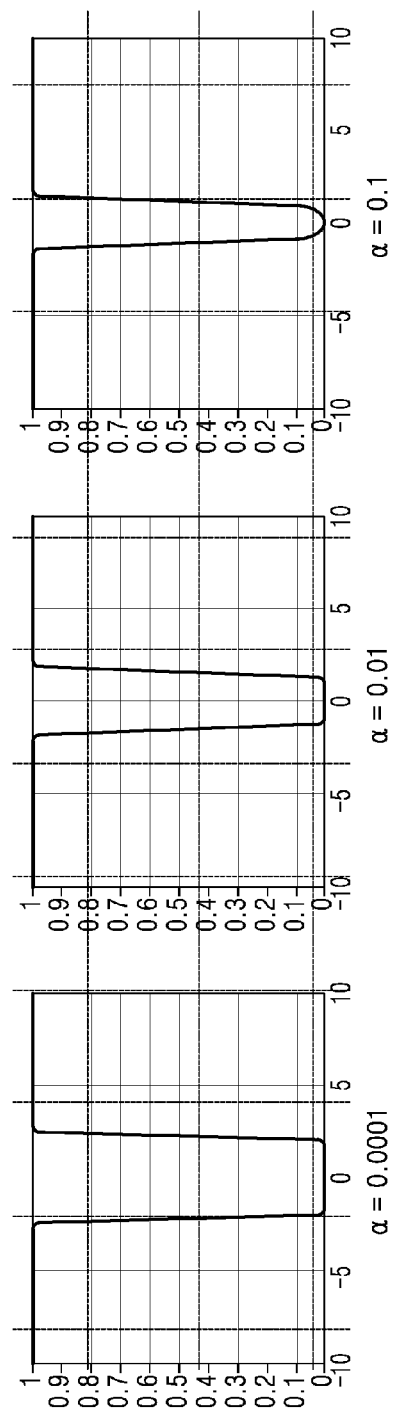
FIGS. 7 and 8 are diagrams illustrating examples for describing a weight conversion function.
Figure 8:
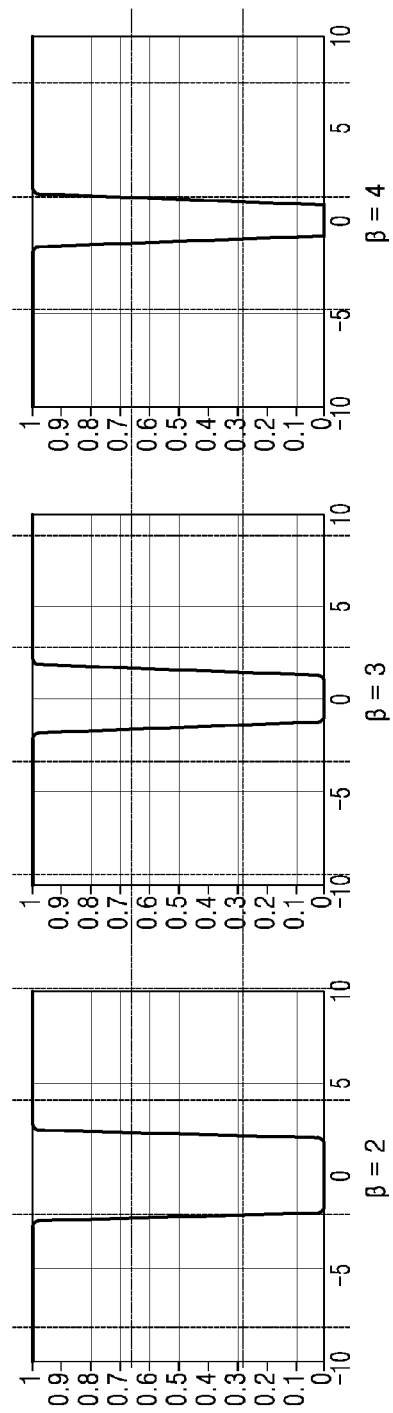

FIGS. 7 and 8 diagrams illustrating examples of graphs for describing a weight conversion function.

In FIGS. 7 and 8, the horizontal axis indicates weights before conversion and the vertical axis indicates values of the weight conversion function.

For example, a weight conversion function f may be expressed by Equation 10.

$$f(w, \alpha, \beta) = \frac{1}{1 + \exp(-\beta^2 w^2)/\alpha^2} \quad \text{[Equation 10]}$$

In Equation 10, w denotes a weight, β denotes a threshold value-determining variable, and α denotes a variable for determining a slope by which the weight conversion function changes before and after a threshold value.

FIG. 7 shows a graph of a weight conversion function for each of different α when β=4. As α increases, the value of the weight conversion function may be gradually changed based on a threshold value.

FIG. 8 is a graph showing weight conversion functions for different β when α=0.0001. As β increases, the area of weights converted to values close to 0 may decrease.

In an example, when the value of the weight conversion function is less than or equal to a certain value, a weight value may be converted to 0.

For example, in a weight region where the value of f(w, α, β)=1/(1+exp (−β^2 w^2)/α^2) is less than 0.5, the weight conversion function may be determined as f(w, α, β)=0.

The weight conversion function f may be in various forms and that other functions also fall within the scope of the present disclosure.

Figure 9:
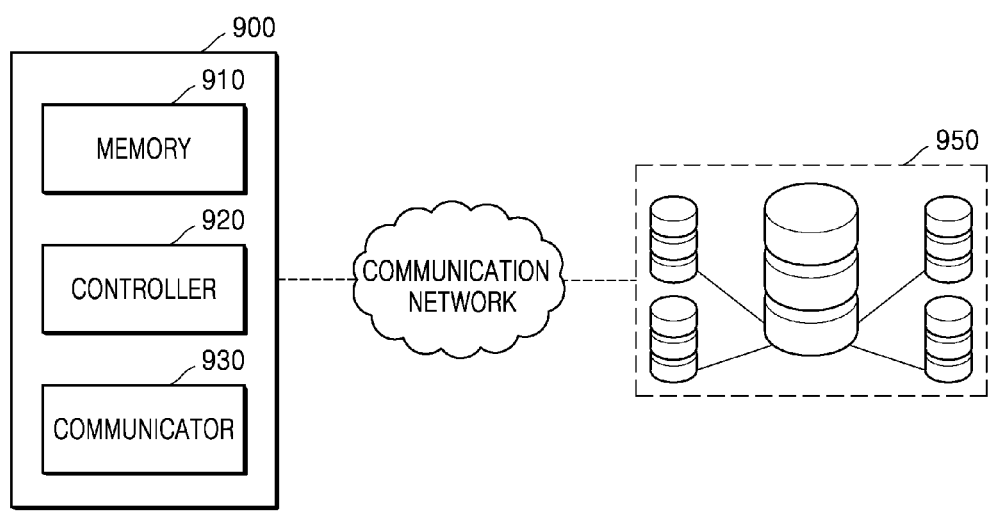
FIG. 9 is a diagram illustrating an example of a device including an artificial neural network and an apparatus for compressing an artificial neural network.

FIG. 9 is a diagram illustrating an example of a device including an artificial neural network 950 and an apparatus 900 for compressing the artificial neural network 950.

For example, the artificial neural network 950 may be a device included in an external server and a database of the apparatus 900.

The apparatus 900 may include a memory 910, a controller 920, and a communicator 930.

The descriptions of the memory (310 of FIG. 3) and the controller (320 of FIG. 3) given above may be applied to the memory 910 and the controller 920 of FIG. 9 to the extent that the above descriptions do not contradict the embodiment of FIG. 9.

The apparatus 900 may form a communication network with the artificial neural network 950 through the communicator 930.

The apparatus 900 may obtain information regarding the artificial neural network 950 from the artificial neural network 950 via the communicator 930. The apparatus 900 may access the information regarding the artificial neural network 950 through the communicator 930, and thus, there is no need to store all information regarding the artificial neural network 950 in the memory 910.

In addition, the apparatus 900 may be implemented in various ways. For example, the apparatus 900 may be implemented in a user terminal and an external artificial neural network is accessed to obtain a compressed artificial neural network. In another example, an artificial neural network and apparatus 900 may be integrated into a user terminal. In another example, the apparatus 900 and an artificial neural network may be implemented separately from a user terminal, and the user terminal may obtain only an artificial neural network compressed by the apparatus 900.

Figure 10:
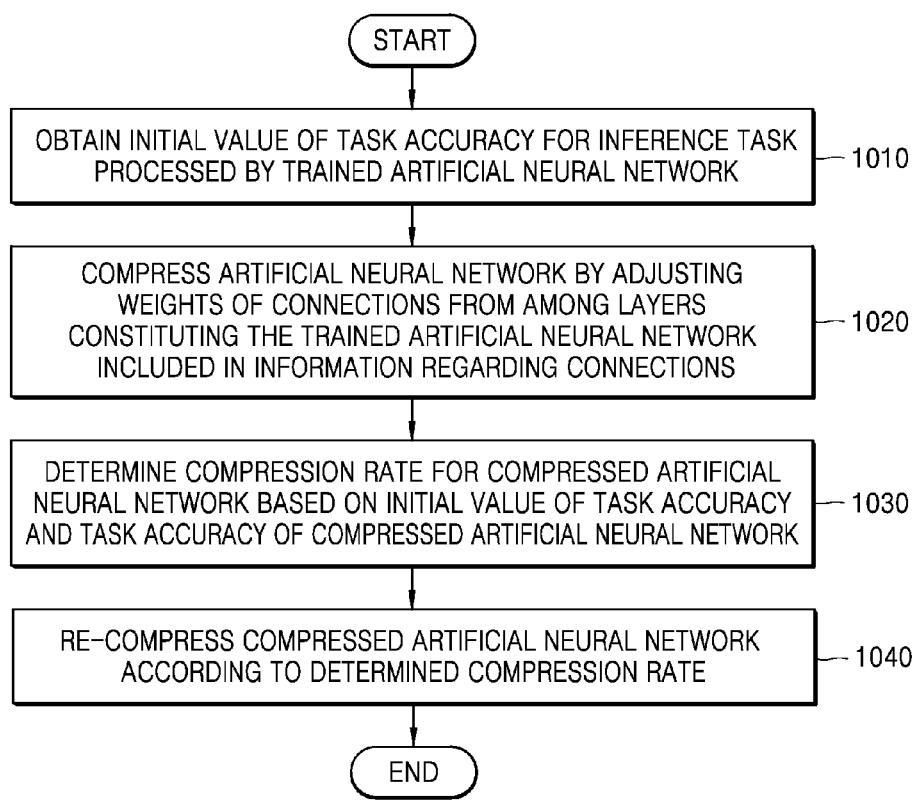
FIG. 10 is a diagram illustrating an example of a compression method that is performed by an apparatus for compressing an artificial neural network.

FIG. 10 is a diagram illustrating an example of a compression algorithm performed by an apparatus for compressing an artificial neural network. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions.

In an example, the operations of FIG. 10 may be performed by the apparatus (300 of FIG. 3) for compressing an artificial neural network. The ranges of numerical values and variables and equations used in FIG. 10 may be modified within other ranges, without departing from the spirit and scope of the illustrative examples described. In addition to the description of FIG. 10 below, the descriptions of FIGS. 1-9 are also applicable to FIG. 10, and are incorporated herein by reference. Thus, the above description may not be repeated here.

In operation 1010, the apparatus may obtain an initial value of the task accuracy for an inference task processed by a trained artificial neural network.

The apparatus may obtain the task accuracy of the trained artificial neural network as the initial value of the task accuracy before performing compression. For example, the task accuracy may be calculated by inputting a training data set and evaluating results predicted by an artificial neural network.

In operation 1020, the apparatus may compress the artificial neural network by adjusting weights of connections included in information regarding connections from among layers that constitute a trained artificial neural network.

The apparatus may compress the artificial neural network by adjusting at least some of interlayer connections used to transmit and receive the information regarding the layers of the trained artificial neural network.

In operation 1030, the apparatus may determine a compression rate for the compressed artificial neural network based on the initial value of the task accuracy and the task accuracy of the compressed artificial neural network. In an example, the apparatus may determine the compression rate such that the task accuracy of the compressed artificial neural network is increased.

In operation 1040, the device may re-compress the compressed artificial neural network, according to the determined compression rate.

The device may determine a compression ratio of the artificial neural network based on the determined compression rate and the task accuracy of the compressed artificial neural network and re-compress the artificial neural network based on the determined compression ratio. At this time, the apparatus may re-compress the artificial neural network by adjusting weights among nodes belonging to different layers from among layers constituting the compressed artificial neural network according to the determined compression ratio.

The apparatus 300, controller 320, electronic device 400, controller 410, neuromorphic device 430, communication module 450, artificial neural network 950, apparatus 900 for compressing the artificial neural network, controller 920, communicator 930 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of compressing an artificial neural network, the method comprising: obtaining an initial value of a task accuracy for an inference task processed by the artificial neural network before compression; first compressing the artificial neural network by adjusting weights of connections among layers of the artificial neural network; determining, based on the initial value of the task accuracy of the artificial neural network and a task accuracy of the first compressed artificial neural network, a first compression rate; second compressing, according to the first compression rate, the first compressed artificial neural network; and generating, based on an input provided to the second compressed artificial neural network, an inference output; wherein the determining of the first compression rate comprises, in response to the task accuracy of the first compressed artificial neural network being less than the initial value, increasing a second compression rate for compressing the first compressed artificial neural network to increase the task accuracy of the second compressed artificial neural network.

2. The method of claim 1, further comprising: performing a compression-evaluation operation to determine a task accuracy of the first compressed artificial neural network and a second compression rate for compressing the first compressed artificial neural network.

3. The method of claim 2, further comprising performing, based on an accuracy loss threshold and the task accuracy of the first compressed artificial neural network, the operation.

4. The method of claim 1, further comprising: comparing the first compression rate with a lower threshold; determining, based on a result of the comparison, whether to terminate a current compression session and to start a-another compression session after the first compression rate is set to an initial reference value.

5. The method of claim 1, wherein the second compressing of the artificial neural network comprises: determining, based on the first compression rate and a task accuracy for a task processed by the first compressed artificial neural network, a compression ratio of the first compressed artificial neural network; and second compressing, based on the determined compression ratio, the first compressed artificial neural network.

6. The method of claim 5, wherein the second compressing of the first compressed artificial neural network comprises second compressing the first compressed artificial neural network by adjusting weights from among nodes belonging to different layers from among layers of the first compressed artificial neural network according to the compression ratio.

7. The method of claim 5, wherein the compression ratio is determined to reduce a degree of loss of a task accuracy with respect to the first compression rate.

8. The method of claim 1, wherein the artificial neural network comprises a trained artificial neural network.

9. A non-transitory computer-readable storage medium storing instructions that, when executed by a processor, cause the processor to perform the method of claim 1.

10. An apparatus for compressing an artificial neural network, the apparatus comprising: a processor is configured to: obtain an initial value of a task accuracy for an inference task processed by the artificial neural network before compression; first compress the artificial neural network by adjusting weights of connections among layers of the artificial neural network; determine, based on the initial value of the task accuracy of the artificial neural network and a task accuracy of the first compressed artificial neural network, a first compression rate; second compress, according to the first compression rate, the first compressed artificial neural network; and generate, based on an input provided to the second compressed artificial neural network, an inference output; wherein, in response to the task accuracy of the first compressed artificial neural network being less than the initial value, a second compression rate for compressing the first compressed artificial neural network, the processor is further configured to increase the task accuracy of the second compressed artificial neural network.

11. The apparatus of claim 10, wherein the processor is further configured to perform a compression-evaluation operation to determine a task accuracy of the first compressed artificial neural network and a second compression rate for the compressing the first compressed artificial neural network.

12. The apparatus of claim 10, wherein the processor is further configured to determine, based on an accuracy loss threshold and the task accuracy of the first compressed artificial neural network, whether to perform the compression-evaluation operation.

13. The apparatus of claim 10, wherein the processor is further configured to: compare the first compression rate with a lower threshold; and determine, based on a result of the comparison, whether to terminate a current compression session and to start another compression session after the first compression rate is set to an initial reference value.

14. The apparatus of claim 10, wherein the processor is further configured to: determine, based on the first compression rate and a task accuracy for a task processed by the first compressed artificial neural network, a compression ratio of the first compressed artificial neural network; and second compress the first compressed artificial neural network based on the determined compression ratio.

15. The apparatus of claim 12, wherein the processor is further configured to second compress the first compressed artificial neural network by adjusting weights from among nodes belonging to different layers from among layers of the first compressed artificial neural network according to the compression ratio.

16. The apparatus of claim 12, wherein the processor is further configured to second compress the first compressed artificial neural network by adjusting weights with a value lesser than a threshold from among nodes of the first compressed artificial neural network according to the compression ratio.

17. The apparatus of claim 12, wherein the compression ratio is determined to reduce a degree of loss of a task accuracy with respect to the first compression rate.

18. The method of claim 1, wherein the compressing of the artificial neural network includes pruning, based on the initial value of the task accuracy, weights of connections that are equal to or less than a threshold.

19. The method of claim 1, wherein the compression rate is a degree to which compression is to be performed with respect to a time for performing one compression.

20. The method of claim 1, further comprising obtaining an average task accuracy based on the initial value of the task accuracy of the artificial neural network and the task accuracy of the first compressed artificial neural network for determining a subsequent compression rate to the first compression rate.

* * * * *